United States Patent
Zinger et al.

(10) Patent No.: US 12,282,660 B2
(45) Date of Patent: Apr. 22, 2025

(54) QUALITY OF SERVICE (QOS) ENFORCEMENT WHILE CONSERVING MEMORY RESOURCES IN A DATA STORAGE SYSTEM

(71) Applicant: Dell Products L.P., Round Rock, TX (US)

(72) Inventors: Eldad Zinger, Raanana (IL); Vitaly Zharkov, Modiin (IL); Elad Grupi, Pardes Hana (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/226,874

(22) Filed: Jul. 27, 2023

(65) Prior Publication Data
US 2025/0036286 A1    Jan. 30, 2025

(51) Int. Cl.
*G06F 3/06* (2006.01)
(52) U.S. Cl.
CPC .......... *G06F 3/0613* (2013.01); *G06F 3/0631* (2013.01); *G06F 3/0659* (2013.01); *G06F 3/067* (2013.01)
(58) Field of Classification Search
CPC .... G06F 3/0613; G06F 3/0631; G06F 3/0659; G06F 3/067
USPC ........................................................ 711/154
See application file for complete search history.

(56) References Cited

U.S. PATENT DOCUMENTS

| | | | |
|---|---|---|---|
| 9,678,665 B2 | 6/2017 | Karamcheti et al. | |
| 10,133,659 B2 | 11/2018 | Kim et al. | |
| 10,275,376 B2 | 4/2019 | Narasimha et al. | |
| 11,468,960 B2 * | 10/2022 | Lam | G11C 5/063 |
| 11,816,037 B2 | 11/2023 | Raasch et al. | |
| 2022/0405150 A1 * | 12/2022 | Weckwerth | G06F 9/52 |

* cited by examiner

*Primary Examiner* — Hua J Song
(74) *Attorney, Agent, or Firm* — BainwoodHuang

(57) ABSTRACT

Deferred memory page allocation commands and non-deferred memory page allocation commands are identified within host I/O commands received by a data storage system. For each one of those received host I/O commands that are identified as a deferred memory page allocation command, QoS (Quality of Service) policy enforcement is performed before any memory pages are allocated by the data storage system to store host data indicated by the received command. Host I/O commands that are identified as deferred memory page allocation commands include read commands, and host I/O commands that are identified as non-deferred memory page allocation commands include in-capsule write commands. For commands identified as deferred memory page allocation commands, enforcing QoS policy before any memory pages are allocated to store host data indicated by the command avoids the possibility of enqueueing the allocated memory pages onto the QoS wait queue, thus conserving data storage system memory resources.

19 Claims, 8 Drawing Sheets

QUALITY OF SERVICE (QOS) ENFORCEMENT WHILE CONSERVING MEMORY RESOURCES IN A DATA STORAGE SYSTEM

TECHNICAL FIELD

The present disclosure relates generally to data storage systems that enforce Quality of Service (QoS) policies with regard to the host Input/Output (I/O) commands they receive and process.

BACKGROUND

Data storage systems are arrangements of hardware and software that are coupled to non-volatile data storage drives, such as solid state drives and/or magnetic disk drives. The data storage system services host I/O commands received from physical and/or virtual host machines ("hosts"). The host I/O commands received by the data storage system specify host data that is written and/or read by the hosts. The data storage system executes software that processes the host I/O commands by performing various data processing tasks to efficiently organize and persistently store the host data in the non-volatile data storage drives of the data storage system.

Data storage systems may enforce QoS policies provided by the hosts. In this regard, the data storage system may operate as a traffic limiter with regard to host I/O commands it receives that are directed to objects with which the QoS policies are associated. Examples of the per-object QoS policies that may be enforced by a data storage system include Maximum Bandwidth (e.g. megabytes or gigabytes per second), which defines an upper limit on the rate at which data may be transferred to and/or from an object, and Maximum I/O Rate (e.g. I/O operations per second), which defines an upper limit on the rate at which host I/O commands directed to an object may be processed.

SUMMARY

In the disclosed technology, deferred memory page allocation commands and non-deferred memory page allocation commands are identified within host I/O commands received by a data storage system. For each one of those received host I/O commands that are identified as a deferred memory page allocation command, the disclosed technology performs QoS (Quality of Service) policy enforcement before any memory pages are allocated by the data storage system to store host data indicated by the command.

In some embodiments, performing QoS policy enforcement before any memory pages are allocated to store host data indicated by the command includes, in response to determining that a QoS policy would be violated by processing the command immediately, enqueuing a command descriptor for the command onto a QoS wait queue. The command descriptor includes an indication that memory pages needed to store the host data indicated by the command are to be allocated when the command descriptor is subsequently dequeued from the QoS wait queue.

In some embodiments, the command descriptor for the command is subsequently dequeued from the QoS wait queue at a time when the command can be completed in conformance with the QoS policy. In response to the dequeuing of the command descriptor for the command from the QoS wait queue, and responsive to the indication that memory pages needed to store host data indicated by the command are to be allocated when the command descriptor is dequeued from the QoS wait queue, the memory pages needed to store the host data indicated by the command are allocated, and the command is then processed to completion based on the command descriptor, using the allocated memory pages.

In some embodiments, identifying deferred memory page allocation commands and non-deferred memory page allocation commands includes identifying each read command received by the data storage system as a deferred page allocation command. The host data indicated by each read command is host data stored in non-volatile data storage of the data storage system, and processing each read command based on the command descriptor using the allocated memory pages includes reading the host data indicated by the read command into the allocated memory pages prior to conveying the host data indicated by the read command to a host device that issued the read command.

In some embodiments, for each one of those received host I/O commands identified as a non-deferred memory page allocation command, any memory pages needed to store host data indicated by the command are allocated before performing QoS policy enforcement.

In some embodiments, identifying deferred memory page allocation commands and non-deferred memory page allocation commands includes identifying each in-capsule write command received by the data storage system as a non-deferred page allocation command. Each in-capsule write command is received by the data storage system from a host device together with the host data transmitted by the host with the command, and that is to be written by the in-capsule write command to non-volatile data storage. The host data indicated by each in-capsule write command comprises the host data transmitted from the host together with the in-capsule write command. For each received in-capsule write command, the memory pages needed to store host data indicated by the in-capsule write command are memory pages that are used to temporarily store the host data that is transmitted together with the in-capsule write command, prior to storing that host data into the non-volatile data storage of the data storage system.

In some embodiments, for each in-capsule write command and prior to allocating any memory pages needed to store the host data transmitted together with the in-capsule write command, the disclosed technology compares a size of the host data transmitted together with the in-capsule write command to a pre-determined upper limit. In response to the size of the host data transmitted together with the in-capsule write command exceeding the pre-determined upper limit, processing of the in-capsule write command is terminated without allocating any memory pages to store the host data transmitted together with the in-capsule write command.

In some embodiments, identifying deferred memory page allocation commands and non-deferred memory page allocation commands by the disclosed technology includes identifying each write command that is received by the data storage system without host data to be written to non-volatile data storage as a deferred page allocation command.

In some embodiments, wherein identifying deferred memory page allocation commands and non-deferred memory page allocation commands by the disclosed technology includes identifying each write zero command received by the data storage system as a non-deferred page allocation command that needs no memory pages to be allocated to store host data.

In some embodiments, identifying deferred memory page allocation commands and non-deferred memory page allocation commands by the disclosed technology includes identifying each data set management command received by the data storage system as a non-deferred memory page allocation command.

The disclosed technology is integral to a practical technical solution for performing QoS policy enforcement while conserving memory resources in a data storage system. For those commands identified as deferred memory page allocation commands, enforcing QoS policy before any memory pages are allocated to store host data indicated by the commands avoids the possibility that previously allocated memory pages will be enqueued onto a QoS wait queue during QoS policy enforcement, thus conserving memory resources in the data storage system. The memory resource conservation provided by the disclosed technology is especially important in data storage systems in which the pool of memory pages available for allocation to service certain types of host I/O commands (e.g. to service NVMe (Non-Volatile Memory Express) commands) is limited in size. Without the disclosed technology, a pool of memory pages is likely to more likely to become empty in the event that large numbers of allocated memory pages are enqueued onto the QoS wait queue. Exhaustion of the memory page allocation pool could potentially result in blocking of host I/O commands sent to the data storage system, including host I/O commands directed to objects (e.g. storage volumes) other than the object that is associated with the QoS policy that is causing the memory pages to be enqueued to the QoS wait queue.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
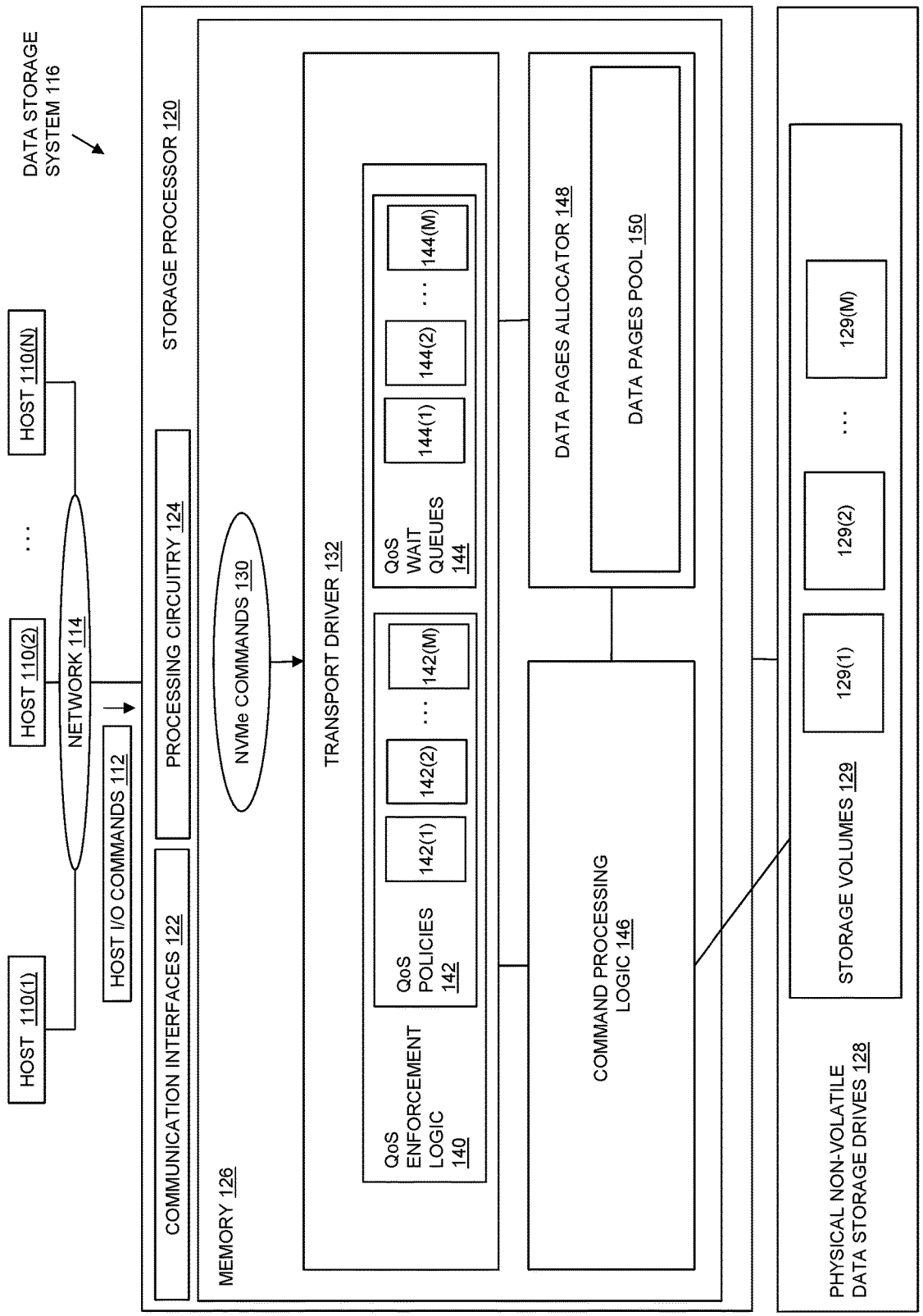
FIG. 1 is a block diagram showing an illustrative example of components in a data storage system including an embodiment of the disclosed technology.

Embodiments will now be described with reference to the figures. The embodiments described herein are provided only as examples, in order to illustrate various features and principles of the disclosed technology, and are not limiting. The embodiments of disclosed technology described herein are integrated into a practical solution for performing QoS policy enforcement while conserving memory resources in a data storage system.

As further described below, in various embodiments of the disclosed technology, deferred memory page allocation commands and non-deferred memory page allocation commands are identified within host I/O commands that are received by a data storage system. For each one of those received host I/O commands that are identified as a deferred memory page allocation command, the disclosed technology performs QoS (Quality of Service) policy enforcement before any memory pages are allocated by the data storage system to store host data indicated by the command. In response to a determination that a QoS policy would be violated by processing a deferred memory page allocation command immediately, performing QoS policy enforcement before any memory pages are allocated to store host data indicated by the command may include enqueuing a command descriptor for the command onto a QoS wait queue. The command descriptor may include an indication that memory pages needed to store the host data indicated by the command are to be allocated when the command descriptor is subsequently dequeued from the QoS wait queue. The command descriptor for the command is subsequently dequeued from the QoS wait queue in conformance with the QoS policy, i.e. at a time when processing the command to completion will not violate the QoS policy. In response to dequeuing of the command descriptor for the command from the QoS wait queue, and to the indication in the command descriptor that memory pages needed to store host data indicated by the command are to be allocated when the command descriptor is dequeued from the QoS wait queue, the memory pages needed to store the host data indicated by the command are allocated, and the command is then processed based on the command descriptor, using the allocated memory pages.

Identifying deferred memory page allocation commands and non-deferred memory page allocation commands may include identifying each read command received by the data storage system as a deferred page allocation command. The host data indicated by each read command is the host data to be read from non-volatile data storage of the data storage system, and processing each read command based on the command descriptor using the allocated memory pages includes reading the host data indicated by the read command from non-volatile data storage into the allocated memory pages prior to conveying the host data indicated by the read command to the host device that issued the read command.

For host I/O commands identified as a non-deferred memory page allocation command, memory pages that may be needed to store host data indicated by the command are allocated before performing QoS policy enforcement. Identifying deferred memory page allocation commands and non-deferred memory page allocation commands may include identifying each in-capsule write command received by the data storage system as a non-deferred page allocation command. Each in-capsule write command is received by the data storage system from a host device together with the host data that is to be written to the non-volatile data storage of the data storage system by processing of the in-capsule write command. The host data indicated by each in-capsule write command is the host data transmitted together with the in-capsule write command. For each received in-capsule write command, the memory pages needed to store host data indicated by the in-capsule write command are memory pages that are used to temporarily store the host data transmitted together with the in-capsule write command, prior to storing that host data into the non-volatile data storage of the data storage system. For each in-capsule write command, prior to allocating any memory pages needed to store the host data transmitted together with the in-capsule write command, the disclosed technology compares a size of the host data transmitted together with the in-capsule write command to a pre-determined upper limit. In response to the size of the host data transmitted together with the in-capsule write command exceeding the pre-determined upper limit, processing of the in-capsule write command is terminated without allocating any memory pages to store the host data transmitted together with the in-capsule write command.

Identifying deferred memory page allocation commands and non-deferred memory page allocation commands may include identifying each write command that is received by the data storage system without the host data to be written to the non-volatile data storage of the data storage system as a deferred page allocation command.

Identifying deferred memory page allocation commands and non-deferred memory page allocation commands by the disclosed technology may also include identifying each write zero command received by the data storage system as a non-deferred page allocation command that needs no memory pages to be allocated to store host data.

Identifying deferred memory page allocation commands and non-deferred memory page allocation commands by the disclosed technology may further include identifying each data set management command received by the data storage system as a non-deferred memory page allocation command.

FIG. 1 is a block diagram showing an operational environment for the disclosed technology, including an example of a data storage system in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications executing thereon may access non-volatile data storage provided by Data Storage System 116, for example over one or more networks, such as a local area network (LAN), and/or a wide area network (WAN) such as the Internet, etc., and shown for purposes of illustration in FIG. 1 by Network 114. Alternatively, or in addition, one or more of Hosts 110 and/or applications accessing non-volatile data storage provided by Data Storage System 116 may execute within Data Storage System 116.

Data Storage System 116 includes at least one Storage Processor 120 that is communicably coupled to both Network 114 and Physical Non-Volatile Data Storage Drives 128, e.g. at least in part though one or more Communication Interfaces 122. No particular hardware configuration is required, and Storage Processor 120 may be embodied as any specific type of device that is capable of processing host input/output (110) commands (e.g. I/O read commands and I/O write commands, etc.), and of persistently storing host data.

The Physical Non-Volatile Data Storage Drives 128 may include physical data storage drives such as solid state drives, magnetic disk drives, hybrid drives, optical drives, and/or other specific types of drives. Physical Non-Volatile Data Storage Drives 128 include Storage Volumes 129, e.g. storage volumes 129(1) through 129(M). The Storage Volumes 129 are individually identifiable logical units of non-volatile data storage within Physical Non-Volatile Data Storage Drives 128 that are accessible by Hosts 110.

A Memory 126 in Storage Processor 120 stores program code that is executed on Processing Circuitry 124, as well as data generated and/or processed by such program code. Memory 126 may include volatile memory (e.g. RAM), and/or other types of memory.

Processing Circuitry 124 includes or consists of multiple processor cores within one or more multi-core processor packages. Each processor core is made up of electronic circuitry that is capable of independently executing instructions.

Processing Circuitry 124 and Memory 126 together form control circuitry that is configured and arranged to carry out various methods and functions described herein. The Memory 126 stores a variety of software components that may be provided in the form of executable program code. For example, Memory 126 may include software components such as Transport Driver 132, QoS Enforcement Logic 140 within Transport Driver 132, Command Processing Logic 146, and Data Pages Allocator 148.

When program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also include various other specific types of software components.

In the example of FIG. 1, Host I/O Commands 112 include Non-Volatile Memory Express (NVMe) protocol commands issued by Hosts 110 to Data Storage System 116. The NVMe commands issued by Hosts 110 to Data Storage System 116 are received and processed by the combination of Transport Driver 132, Command Processing Logic 146, and Data Pages Allocator 148. Transport Driver 132, Command Processing Logic 146, and Data Pages Allocator 148 may accordingly be considered a software stack that is responsible for receiving and processing NVMe commands issued by Hosts 110 to Data Storage System 116. Host I/O Commands 112 may include commands other than Non-Volatile Memory Express (NVMe) protocol commands, e.g. SCSI (Small Computer System Interface) commands, which may be initially received and processed by other software components (not shown) also executing in Data Storage System 116.

During operation of the components shown in FIG. 1, NVMe commands issued by Hosts 110 to Data Storage System 116 are initially received by Transport Driver 132. Transport Driver 132 identifies deferred memory page allocation commands and non-deferred memory page allocation commands within the received NVMe commands. For example, Transport Driver 132 may distinguish between deferred memory page allocation commands and non-deferred memory page allocation commands at least in part based on the command type and/or sub-type of each one of the received commands. In the disclosed technology, some types and/or sub-types of commands are identified as deferred memory page allocation commands, and some other types and/or sub-types of commands are identified as non-deferred memory page allocation commands, as further described below.

For each one of the received host I/O commands that is identified as a deferred memory page allocation command, the Transport Driver 132 performs QoS (Quality of Service) policy enforcement before any memory pages are allocated by the data storage system to store host data indicated by the command. Transport Driver 132 may perform QoS policy enforcement for each deferred memory page allocation command by executing QoS Enforcement Logic 140, before using Data Pages Allocator 148 to allocate any pages of memory from Data Pages Pool 150 that are needed to temporarily store host data while the command is being processed.

For each one of the received host I/O commands that is identified as a non-deferred memory page allocation command, the Transport Driver 132 performs QoS (Quality of Service) policy enforcement after any memory pages are allocated by the data storage system to store host data indicated by the command, e.g. by executing QoS Enforcement Logic 140 after using Data Pages Allocator 148 to allocate one or more pages of memory from Data Pages Pool 150 that are needed to temporarily store host data while the command is being processed.

For example, Data Pages Pool 150 may be a dedicated pool of memory pages that are specifically made available by Data Pages Allocator 148 for allocation (e.g. by Transport Driver 132) only to support processing of NVMe commands received by Data Storage System 116.

Hosts 110 may define QoS Policies 142 (e.g. QoS policies 142(1), 142(2) through 142(M)). Each one of the QoS Policies 142 is associated with a corresponding storage object that is provided by Data Storage System 116 and is accessible to one or more of the Hosts 110. For example, each one of QoS Policies 142 corresponds to one of the Storage Volumes 129. Accordingly, QoS Enforcement Logic 140 may determine whether a specific QoS policy is or will be violated based on i) the rate at which commands are being processed, and/or ii) the amount of bandwidth that is being consumed, with regard to host I/O commands that are directed to a storage volume corresponding to that QoS policy. For example, each QoS policy may include or consist of a Maximum Bandwidth (e.g. megabytes or gigabytes per second), which defines an upper limit on the rate at which data can be transferred to and/or from the associated storage volume, and/or a Maximum I/O Rate (e.g. I/O operations per second), which defines an upper limit on the rate at which host I/O commands directed to the associated storage volume can be processed. Accordingly, for example, QoS Enforcement Logic 140 may determine that a QoS policy would be violated by immediate processing of a received command if processing of the command immediately would cause the rate at which data is transferred to and/or from the associated storage volume to exceed the Maximum Bandwidth defined for that storage volume, as defined in a corresponding QoS policy. In another example, QoS Enforcement Logic 140 may determine that a QoS policy would be violated by immediate processing of a received command if processing of the command immediately would cause the rate at which host I/O commands directed to the associated storage volume are processed to exceed the Maximum I/O Rate defined for that storage volume, as defined in a corresponding QoS policy.

In response to a determination that a QoS policy would be violated by processing a command immediately, performing QoS policy enforcement may further include QoS Enforcement Logic 140 delaying the processing of the command by enqueuing a command descriptor for the command onto a QoS wait queue (e.g. one of QoS Wait Queues 144) that corresponds to the storage volume associated with that QoS policy. For example, there may be a separate QoS wait queue for each object for which a QoS policy is defined. In the example of FIG. 1, QoS Wait Queues 144 includes QoS wait queues 144(1), 144(2), and so on through 144(M), each of which corresponds to one of the Storage Volumes 129. After a command descriptor is enqueued onto a QoS wait queue, it is subsequently dequeued at a later point in time at which processing of the command can be performed in conformance with the QoS policy that would have been violated had the command been processed immediately upon receipt. For example, in the case where a command descriptor was enqueued onto a QoS policy queue because immediate processing of a command would have caused the rate at which data is transferred to and/or from the storage volume to which the command is directed to exceed the Maximum Bandwidth defined for that storage volume, the command descriptor is subsequently dequeued at a time at which processing of the command will not cause the rate at which data is transferred to and/or from the storage volume to which the command is directed to exceed the storage volume's Maximum Bandwidth. Similarly, in the case where a command descriptor was enqueued onto a QoS policy queue because immediate processing of the command would cause the rate at which host I/O commands directed to the associated storage volume are processed to exceed the Maximum I/O Rate defined for that storage volume, the command descriptor is subsequently dequeued at a time at which processing of the command will not cause the rate at which host I/O commands directed to the storage volume are processed to exceed the storage volume's Maximum I/O Rate.

In the case of host I/O commands identified as deferred memory page allocation commands, for which the Transport Driver 132 performs QoS (Quality of Service) policy enforcement before any memory pages are allocated to store host data indicated by the command, no memory pages are enqueued with the command descriptor onto the QoS wait queue in the event that a QoS policy would be violated by processing the command immediately. Instead, in the event that a QoS policy would be violated by immediate processing of a deferred memory allocation command, QoS Enforcement Logic 140 includes, e.g. within the command descriptor that is enqueued onto the QoS wait queue, an indication that one or more memory pages needed to store the host data indicated by the command are to be allocated when the command descriptor is subsequently dequeued from the QoS wait queue. When QoS Enforcement Logic 140 subsequently dequeues the command descriptor, at least in part responsive to finding the indication in the command descriptor that memory pages needed to store host data indicated by the command are to be allocated when the command descriptor is dequeued from the QoS wait queue, Transport Driver 132 and/or QoS Enforcement Logic 140 invokes Data Pages Allocator 148 to allocate the memory pages from Data Pages Pool 150 that are needed to store the host data indicated by the command. Transport Driver 132 then passes the command descriptor and the allocated memory pages to Command Processing Logic 146, in order for the command to be processed based on the command descriptor, and using the allocated memory pages to temporarily store the host data indicated by the command.

In the example shown in FIG. 1, Transport Driver 132 identifies all received NVMe read commands as deferred page allocation commands. The host data indicated by each read command is the host data to be read from Non-Volatile Data Storage Drives 128 and returned to the one of Hosts 110 that issued the read command. Accordingly, memory pages are allocated from Data Pages Pool 148 by Transport Driver 132 and/or QoS Enforcement Logic 140 using Data Pages Allocator 148, after QoS policy enforcement is performed, and are then passed from Transport Driver 132 to Command Processing Logic 146 together with the command descriptor for the read command. Command Processing Logic 146 uses those memory pages to store host data indicated by the read command as it is read from Non-Volatile Data Storage Drives 128, prior to that host data being conveyed from Data Storage System 116 to the one of Hosts 110 that issued the read command.

In the case of host I/O commands identified by Transport Driver 132 as non-deferred memory page allocation commands, memory pages needed to store host data indicated by the command are allocated from Data Pages Pool 150, e.g. by Transport Driver 132 invoking Data Pages Allocator 148, before Transport Driver 132 invokes QoS Enforcement Logic 140 to perform QoS policy enforcement. In the case of host I/O commands identified as non-deferred memory page allocation commands, QoS Enforcement Logic 140 enqueues any such previously allocated memory pages together with the command descriptor onto the appropriate QoS wait queue in the event that a QoS policy would be violated by processing the command immediately. Accordingly, no indication is added to the command descriptor that memory pages needed to store the host data indicated by the command are to be allocated when the command descriptor is subsequently dequeued from the QoS wait queue. When QoS Enforcement Logic 140 subsequently dequeues the command descriptor and the enqueued memory pages, Transport Driver 132 then passes the command descriptor and the dequeued memory pages to Command Processing Logic 146 for the command to be processed based on the command descriptor, using the memory pages to store host data indicated by the command.

In the example shown in FIG. 1, Transport Driver 132 identifies NVMe in-capsule write commands as non-deferred page allocation commands. NVMe in-capsule write commands are write commands for which the host data to be written to non-volatile data storage is transmitted from the host device to the Data Storage System 116 together with the write command. Accordingly, the host data indicated by each in-capsule write command is the host data transmitted from the host device with the write command, and is to be stored in the Physical Non-Volatile Data Storage Drives 128 (e.g. in one of the Storage Volumes 129 indicated by the command). Accordingly, the memory pages allocated from Data Pages Pool 148 by Transport Driver 132 before QoS policy enforcement is performed are immediately used by Transport Driver 132 to store the host data as it is received from the host device. When QoS policy enforcement is performed, the allocated pages are enqueued to the QoS wait queue with the command descriptor for the in-capsule write command in the event a QoS policy violation is detected, and they are subsequently passed from Transport Driver 132 to Command Processing Logic 146 together with the command descriptor for the in-capsule write command. Command Processing Logic 146 then stores the host data from the memory pages into Non-Volatile Data Storage Drives 128.

For each received in-capsule write command, prior to allocating any memory pages needed to store the host data transmitted together with the command, Transport Driver 132 compares a size of the data to be written (i.e. the size of the host data transmitted together with the command) to an upper limit. In response to the size of the host data transmitted together with the in-capsule write command exceeding the upper limit, Transport Driver 132 terminates processing of the in-capsule write command without allocating any memory pages to store the host data that was transmitted together with the in-capsule write command.

In the example shown in FIG. 1, Transport Driver 132 identifies those NVMe write commands that are received by the data storage system without the host data that is to be written to non-volatile data storage as deferred page allocation commands. Such write commands require a subsequent standalone transaction to be performed, in which the Data Storage System 116 sends a "Ready-to-transfer" or "R2T" message to the host indicating that the Data Storage System 116 is ready to receive the write data for the command, causing the host to send the host data that is to be written to non-volatile storage. After performing QoS policy enforcement for this sub-type of write command, Transport Driver 132 allocates the memory pages that are needed to store the host data before the host data is written to non-volatile data storage, and then sends the Ready-to-transfer message to the host.

In the example shown in FIG. 1, Transport Driver 132 identifies NVMe write-zero commands as non-deferred page allocation commands that need no memory pages to be allocated to store host data. Such commands require no allocation of memory pages to store host data.

Further in the example shown in FIG. 1, Transport Driver 132 identifies NVMe data set management commands as non-deferred memory page allocation commands. Each such command only requires allocation of a single memory page to store host data indicated by the command. Accordingly, processing commands of this type as non-deferred memory page allocation commands should have a minimal effect on the overall amount of memory page allocation from Data Pages Pool 150, and is unlikely to significantly increase the likelihood that Data Pages Pool 150 will become completely exhausted.

Figure 2:
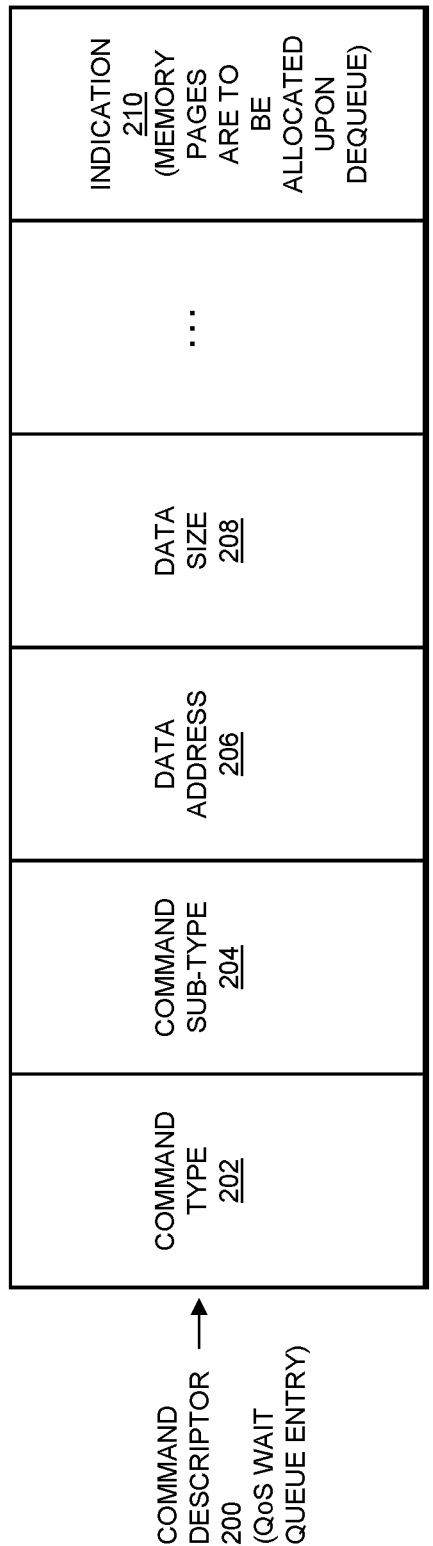
FIG. 2 is a block diagram showing an example of some of the fields in a command descriptor for a deferred memory page allocation command, as enqueued to a QoS wait queue by some embodiments of the disclosed technology.

FIG. 2 is a block diagram showing an example of some of the fields in a Command Descriptor 200 generated for a deferred memory page allocation command. Command Descriptor 200 is enqueued to a QoS wait queue by some embodiments of the disclosed technology. Some fields of the Command Descriptor 200 may be populated by and transmitted from the host as part of a host I/O command. Indication 210 is added by Transport Driver 132.

Command Type 202 may indicate the type of command, e.g. read, write, compare, write-zero, data set management (DSM), etc.

Command Sub-Type 204 may be used to indicate a command sub-type. For example Command Sub-Type 204 may indicate that the host has transmitted the host data to be written to non-volatile data storage together with the command, as in an in-capsule write command, or alternatively that the host has not transmitted the host data to be written together with the command, in which case a ready-to-transfer message must be sent to the host to cause the host to transmit the host data to the data storage system that is to be written to non-volatile data storage.

Data Address 206 may contain an address (e.g. logical address) associated with the command. For example, in the case of a read command, Data Address 206 may be a starting address or offset from which data is requested to be read from the non-volatile data storage of the data storage system and returned to the host. In another example, in the case of a write command or DSM command, Data Address 206 may be the starting address or offset at which the data transmitted from the host is to be stored in non-volatile data storage of the data storage system. In another example, in the case of a write-zeros command, Data Address 206 may be a starting address or offset of a range of logical addresses into which zeros are to be written.

Data Size 208 may contain the size of the host data. For example, in the case of a read command, Data Size 208 may indicate the amount of data to be read and returned to the host. In another example, in the case of a write command, Data Size 208 may indicate the amount of host data transmitted from the host that is to be written to non-volatile data storage. In another example, in the case of a write-zeros command, Data Size 208 may indicate the size of the address range into which zeros are to be written.

Indication 210 may be a flag or the like indicating that upon Command Descriptor 200 being dequeued from a QoS wait queue, any memory pages needed to temporarily store host data while the command is being processed must be allocated. For example, in the case of a read command, Indication 210 indicates that when Command Descriptor 200 is dequeued from a QoS wait queue, memory pages must be allocated for temporarily storing the host data requested read from non-volatile data storage and then subsequently returned to the host.

Figure 3:
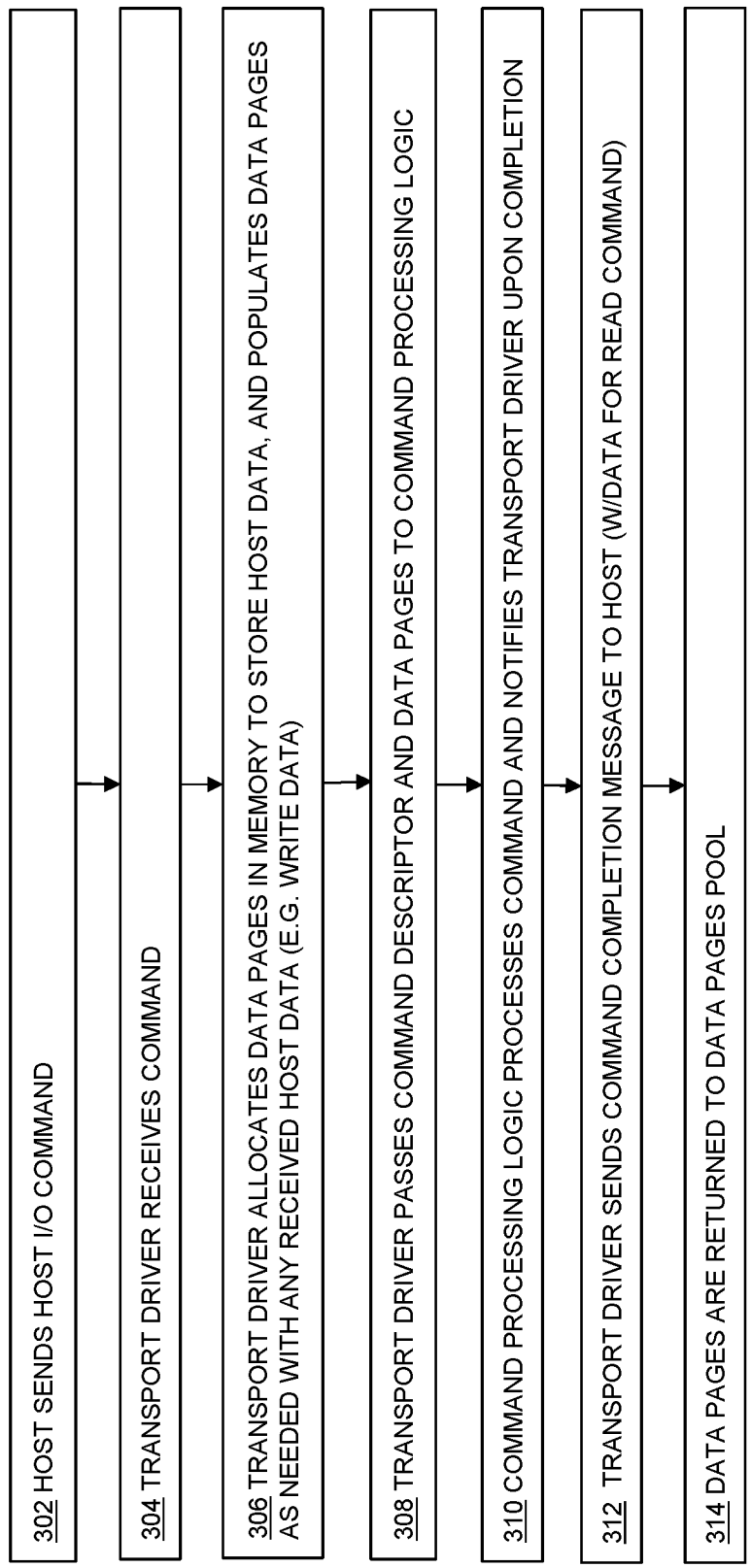
FIG. 3 is a flow chart showing an example of steps performed in general to process host I/O commands received by a data storage system in some embodiments.

FIG. 3 is a flow chart showing a general example of steps performed to process host I/O commands received by a data storage system in some embodiments.

At 302, a host transmits a host I/O command (e.g. an NVMe command) to the data storage system.

At 304, the transport driver in the data storage system receives the command. The transport driver identifies the command as either a deferred memory page allocation command or a non-deferred memory page allocation command.

At 306, the transport driver allocates data pages in memory to temporarily store host data indicated by the command. In the case of a deferred memory page allocation command, QoS policy enforcement is performed before the data pages in memory are allocated. In the case of a non-deferred memory page allocation command, QoS policy enforcement is performed after the data pages in memory are allocated. Also at 306, the allocated data pages in memory may be populated by the transport driver with received host data. For example, in the case of an in-capsule write command, the allocated data pages are populated with the host data that is received from the host with the command.

At step 308, the transport driver passes the command descriptor and allocated data pages in memory to the command processing logic, in order for the command to be processed.

At step 310, the command processing logic processes the command based on the command descriptor and using the allocated data pages in memory to temporarily store host data while processing the command. The command processing logic then notifies the transport driver when the command has been completely processed.

At step 312, the transport driver transmits a command completion message to the host. For example, in the case of a read command, the command completion message may include the host data that was read from non-volatile data storage by processing of the read command.

At step 314, the allocated data pages in memory are returned by the transport driver to the data pages pool, and are then made available by the Data Pages Allocator 148 for subsequent allocation by the transport driver to support the processing of another received command.

Figure 4:
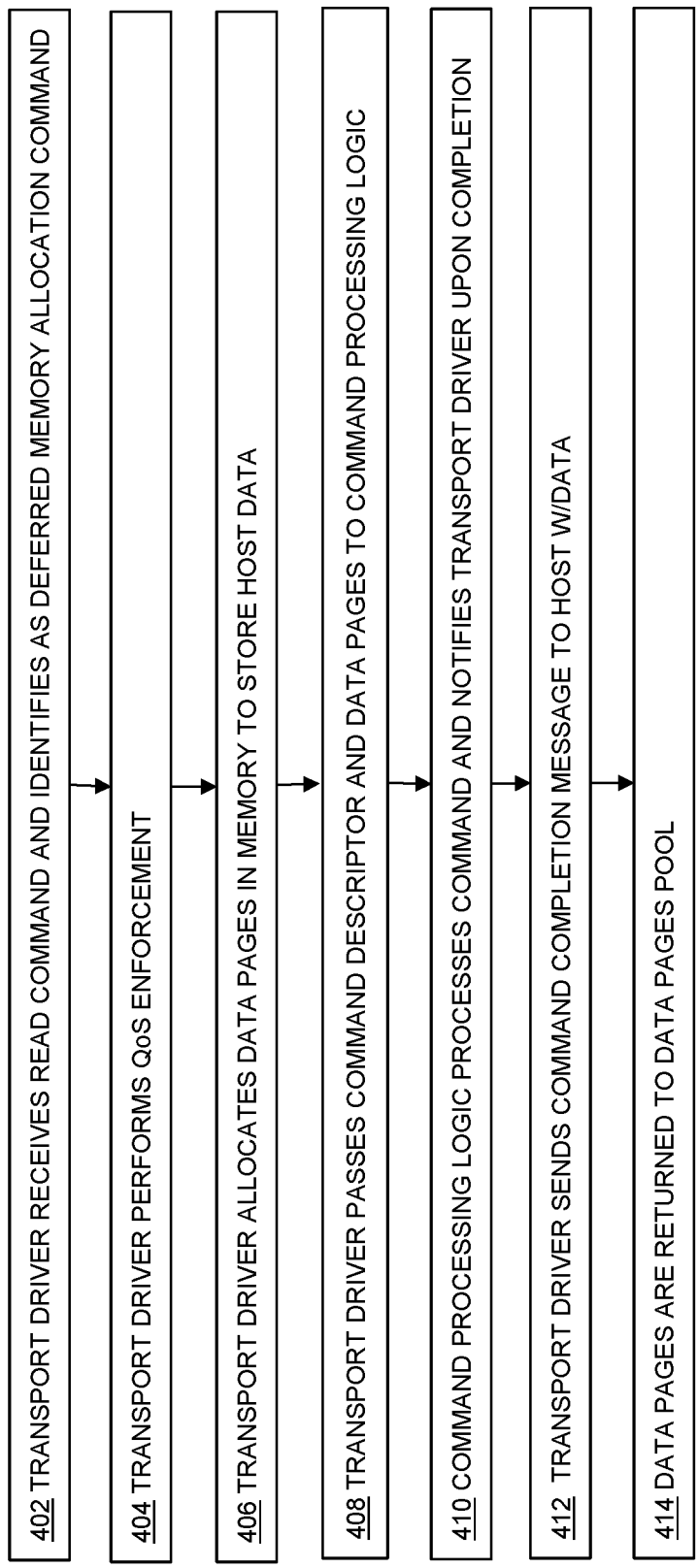
FIG. 4 is a flow chart showing steps performed in some embodiments to process NVMe (Non-Volatile Memory Express) read commands received by the data storage system.

FIG. 4 is a flow chart showing steps performed in some embodiments to process NVMe (Non-Volatile Memory Express) read commands received by the data storage system.

At step 402, the transport driver receives the read command, and identifies it as a deferred memory allocation command.

At step 404, the transport driver performs QoS policy enforcement for the command, prior to allocating any data pages in memory.

At step 406, the transport driver allocates data pages from the data pages pool to temporarily store host data that is read from non-volatile data storage.

At step 408, the transport driver passes the command descriptor for the command and the allocated data pages to the command processing logic.

At step 410, the command processing logic processes the command, including reading the requested host data from non-volatile data storage into the allocated data pages in memory. When the host data requested by the read command has been completely read from the non-volatile data storage into the data pages in memory, the command processing logic notifies the transport driver that the command has been completely processed.

At step 412, in response to the indication that processing of the read command has been completed, the transport driver sends a command completion message to the host that issued the read command, together with the host data temporarily stored in the allocated data pages.

At step 414, the transport driver returns the allocated data pages to the data pages pool, and they are made available for allocation to support processing of another command.

Figure 5:
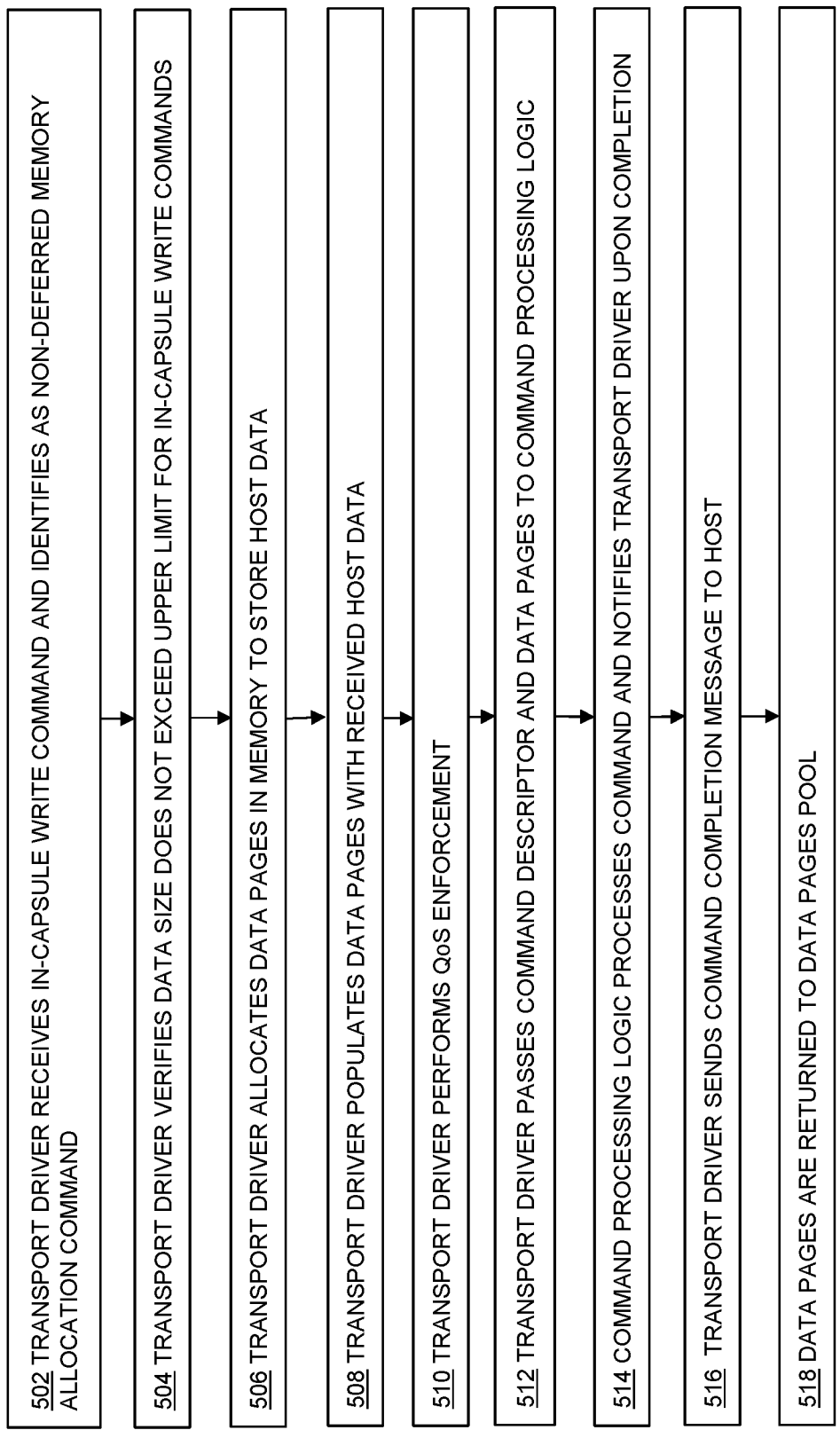
FIG. 5 is a flow chart showing steps performed in some embodiments to process in-capsule NVMe write commands received by the data storage system.

FIG. 5 is a flow chart showing steps performed in some embodiments to process in-capsule NVMe write commands received by the data storage system.

At step 502, the transport driver receives the in-capsule write command and identifies it as a non-deferred memory allocation command.

At step 504, the transport driver verifies that the size of the host data to be written to non-volatile data storage by the in-capsule write command (i.e. the amount of host data transmitted with the command) does not exceed a predefined upper limit on the size of in-capsule write commands. The upper limit may, for example, be configured by a system administrator. If the size of the host data to be written exceeds the upper limit, processing of the command is terminated at step 504 without allocation of any data pages, and an error condition may be reported indicating that the command failed. Otherwise, processing of the command continues at step 506.

At step 506, the transport driver allocates data pages of memory from the data pages pool, to be used to store the host data transmitted with the in-capsule write command before it is stored into non-volatile data storage.

At step 508, the transport driver fills the allocated data pages with the host data that was received from the host.

At step 510, the transport driver performs QoS policy enforcement. If processing of the in-capsule write command immediately would result in a QoS policy violation, then the command is enqueued onto a QoS wait queue, along with the allocated data pages, and remains enqueued until the command descriptor and the data pages are later dequeued at a time at which the command can be processed to completion without causing a QoS policy violation.

After QoS policy enforcement has completed, at step 512 the transport driver passes the command descriptor for the command and the allocated data pages to the command processing logic for processing of the command.

At step 514, the command processing logic processes the command, by storing the host data stored in the allocated data pages into non-volatile data storage. When all the data has been successfully stored into the non-volatile data storage, the command processing logic notifies the transport driver that processing of the command is complete.

In response to the command completion notification, at step 516 the transport driver sends a completion message to the host that transmitted the in-capsule write command.

At step 518, the allocated data pages are returned to the data pages pool, and made available for subsequent allocation to support processing of another command.

Figure 6:
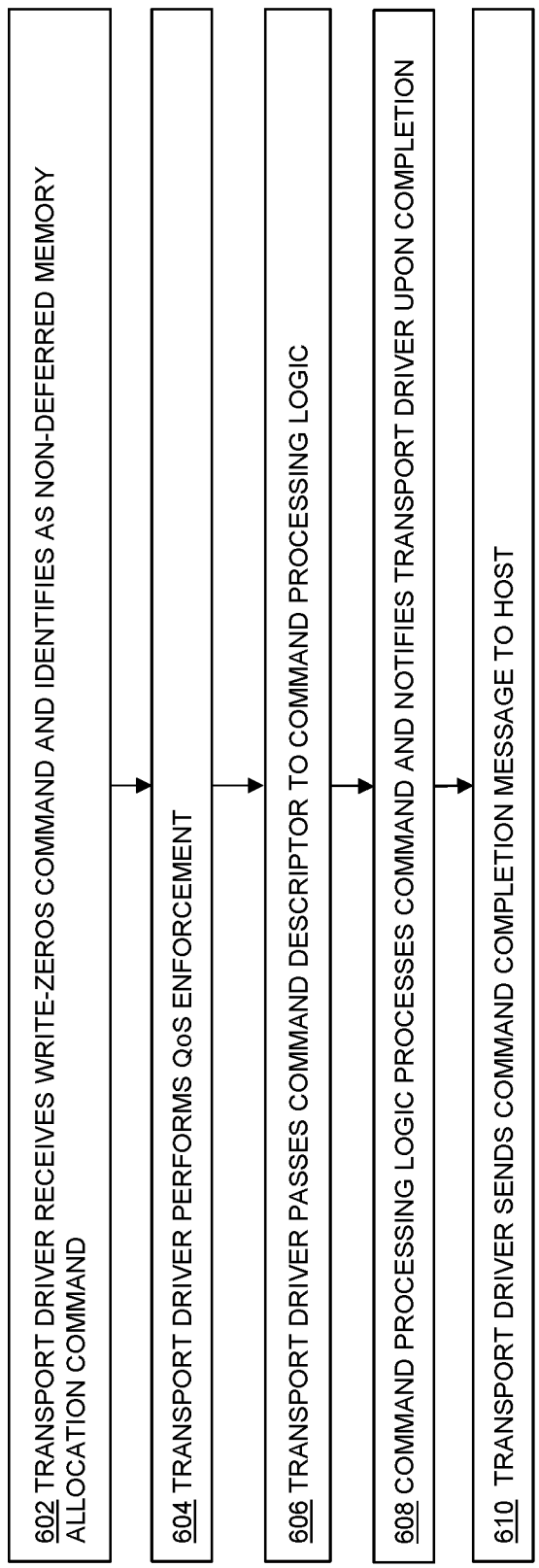
FIG. 6 is a flow chart showing an example of steps performed in some embodiments to process NVMe write-zero commands received by the data storage system.

FIG. 6 is a flow chart showing an example of steps performed in some embodiments to process NVMe write-zero commands received by the data storage system.

At step 602, the transport driver initially receives the write-zeros command, and identifies it as a non-deferred memory allocation command.

At step 604, the transport driver performs QoS policy enforcement on the command. Because write-zeros commands require no allocation of data page from memory, in the event that a QoS policy violation is detected, only the command descriptor for the command is enqueued on the relevant QoS wait queue.

At step 606, the transport driver passes the command descriptor to the command processing logic, after completion of QoS policy enforcement.

At step 608, the command processing logic processes the write-zeros command notifies the transport driver when processing of the command is completed.

At step 610, the transport driver sends a command completion message to the host that issued the write-zeros command. No data pages of memory were allocated to process the command, and accordingly no data pages of memory need to be deallocated.

Figure 7:
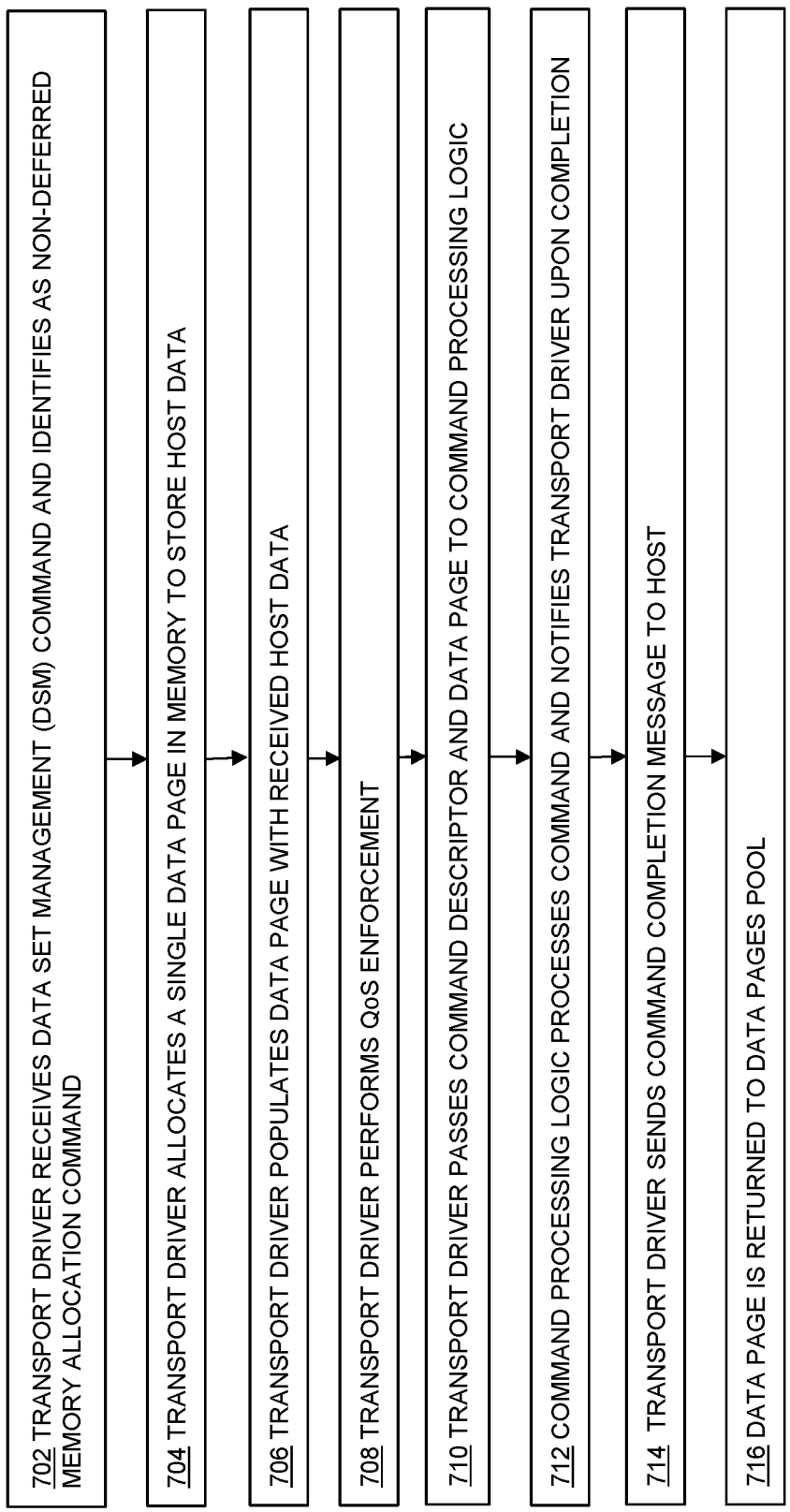
FIG. 7 is a flow chart showing an example of steps performed in some embodiments to process NVMe data set management (DSM) commands received by the data storage system.

FIG. 7 is a flow chart showing an example of steps performed in some embodiments to process NVMe data set management (DSM) commands received by the data storage system.

At step 702, the transport driver initially receives the DSM command and identifies it as a non-deferred memory allocation command.

At step 704, the transport driver allocates a single data page of memory from the data pages pool to store the single page of host data received by the data storage system from the host with the DSM command.

At step 706, the transport driver stores the page of host data received with the DSM command into the allocated data page of memory.

At step 708, the transport driver performs QoS policy enforcement. In the event of a QoS policy violation, the allocated data page is enqueued onto the relevant QoS wait queue along with the command descriptor.

At step 710, the transport driver passes the command descriptor and the allocated data page to the command processing logic for processing of the command.

At step 712, the command processing logic processes the command by storing the data from the allocated data page of memory into non-volatile data storage, and notifies the transport driver of command completion when the data has been successfully stored.

At step 714, the transport driver sends a command completion message to the host that issued the DSM command.

At step 716, the data page of memory is deallocated and returned to the data pages pool, and is made available to support processing of another command.

Figure 8:
FIG. 8 is a flow chart showing an example of steps performed in some embodiments to perform QoS policy enforcement by a transport driver that initially receives host I/O commands (e.g. NVMe commands) in a data storage system.

FIG. 8 is a flow chart showing an example of steps performed in some embodiments to perform QoS policy enforcement in a transport driver that receives host I/O commands (e.g. NVMe commands) in a data storage system.

At step 802, the disclosed technology identifies, within host I/O commands received by a data storage system from one or more host devices, deferred memory page allocation commands and non-deferred memory page allocation commands.

At step 804, for each one of those received host I/O commands that were identified as a deferred memory page allocation command, the disclosed technology performs QoS (Quality of Service) policy enforcement before any memory pages are allocated to store host data indicated by the command.

As will be appreciated by those skilled in the art, aspects of the technology disclosed herein may be embodied as a system, method, or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   identifying, within host I/O commands received by a data storage system, deferred memory page allocation commands and non-deferred memory page allocation commands; and
   for each one of those received host I/O commands identified as a deferred memory page allocation command, performing QoS (Quality of Service) policy enforcement before any memory pages are allocated to store host data indicated by the command, at least in part by:
      in response to determining that a QoS policy would be violated by processing the command immediately, enqueuing a command descriptor for the command onto a QoS wait queue, wherein the command descriptor includes an indication that memory pages needed to store the host data indicated by the command are to be allocated when the command descriptor is subsequently dequeued from the QoS wait queue.

2. The method of claim 1, further comprising:
   dequeuing the command descriptor for the command from the QoS wait queue in conformance with the QoS policy; and
   in response to the dequeuing of the command descriptor for the command from the QoS wait queue, and responsive to the indication that memory pages needed to store host data indicated by the command are to be allocated when the command descriptor is dequeued from the QoS wait queue, allocating the memory pages needed to store the host data indicated by the command and processing the command based on the command descriptor using the allocated memory pages.

3. The method of claim 2, wherein identifying deferred memory page allocation commands and non-deferred memory page allocation commands includes identifying each read command as a deferred page allocation command;
   wherein the host data indicated by each read command comprises host data stored in non-volatile data storage of the data storage system; and
   wherein processing each read command based on the command descriptor using the allocated memory pages comprises reading the host data indicated by the read command into the allocated memory pages prior to conveying the host data indicated by the read command to a host device that issued the read command.

4. The method of claim 1, further comprising:
   for each one of those received host I/O commands identified as a non-deferred memory page allocation command, allocating any memory pages needed to store host data indicated by the command before performing QoS policy enforcement.

5. The method of claim 4, wherein identifying deferred memory page allocation commands and non-deferred memory page allocation commands includes identifying each in-capsule write command as a non-deferred page allocation command, wherein each in-capsule write command is transmitted by a host together with the host data to be written by the in-capsule write command;
   wherein the host data indicated by each in-capsule write command comprises the host data transmitted together with the in-capsule write command; and
   wherein for each in-capsule write command, the memory pages needed to store host data indicated by each in-capsule write command comprise memory pages for storing the host data transmitted together with the in-capsule write command prior to storing the host data transmitted together with the in-capsule write command to non-volatile data storage of the data storage system.

6. The method of claim 5, further comprising, for each in-capsule write command and prior to allocating any memory pages needed to store the host data transmitted together with the in-capsule write command:
   comparing a size of the host data transmitted together with the in-capsule write command to a pre-determined upper limit; and
   in response to the size of the host data transmitted together with the in-capsule write command exceeding the pre-determined upper limit, terminating processing of the in-capsule write command without allocating any memory pages needed to store the host data transmitted together with the in-capsule write command.

7. The method of claim 1, wherein identifying deferred memory page allocation commands and non-deferred memory page allocation commands includes identifying each write command received without host data to be written as a deferred page allocation command.

8. The method of claim 1, wherein identifying deferred memory page allocation commands and non-deferred memory page allocation commands includes identifying each write zero command received as a deferred page allocation command.

9. The method of claim 1, wherein identifying deferred memory page allocation commands and non-deferred memory page allocation commands includes identifying each data set management command as a non-deferred memory page allocation command.

10. A data storage system comprising:
    processing circuitry and a memory;
    a plurality of non-volatile data storage drives; and
    wherein the memory has program code stored thereon, wherein the program code, when executed by the processing circuitry, causes the processing circuitry to:
       identify, within host I/O commands received by a data storage system, deferred memory page allocation commands and non-deferred memory page allocation commands; and
       for each one of those received host I/O commands identified as a deferred memory page allocation command, perform QoS (Quality of Service) policy enforcement before any memory pages are allocated to store host data indicated by the command, at least in part by:

in response to determining that a QoS policy would be violated by processing the command immediately, enqueuing a command descriptor for the command onto a QoS wait queue, wherein the command descriptor includes an indication that memory pages needed to store the host data indicated by the command are to be allocated when the command descriptor is subsequently dequeued from the QoS wait queue.

11. The data storage system of claim 10, wherein the program code, when executed by the processing circuitry, further causes the processing circuitry to:

dequeue the command descriptor for the command from the QoS wait queue in conformance with the QoS policy; and in response to the dequeuing of the command descriptor for the command from the QoS wait queue, and responsive to the indication that memory pages needed to store host data indicated by the command are to be allocated when the command descriptor is dequeued from the QoS wait queue, allocate the memory pages needed to store the host data indicated by the command and processing the command based on the command descriptor using the allocated memory pages.

12. The data storage system of claim 11, wherein identification of deferred memory page allocation commands and non-deferred memory page allocation commands includes identification of each read command as a deferred page allocation command;

wherein the host data indicated by each read command comprises host data stored in non-volatile data storage of the data storage system; and wherein processing each read command based on the command descriptor using the allocated memory pages includes reading the host data indicated by the read command into the allocated memory pages prior to conveying the host data indicated by the read command to a host device that issued the read command.

13. The data storage system of claim 10, wherein the program code, when executed by the processing circuitry, further causes the processing circuitry to:

for each one of those received host I/O commands identified as a non-deferred memory page allocation command, allocate any memory pages needed to store host data indicated by the command before performing QoS policy enforcement.

14. The data storage system of claim 13, wherein causing the processing circuitry to identify the deferred memory page allocation commands and non-deferred memory page allocation commands includes causing the processing circuitry to identify each in-capsule write command as a non-deferred page allocation command, wherein each in-capsule write command is transmitted by a host together with the host data to be written by the in-capsule write command;

wherein the host data indicated by each in-capsule write command comprises the host data transmitted together with the in-capsule write command; and wherein for each in-capsule write command, the memory pages needed to store host data indicated by each in-capsule write command comprise memory pages for storing the host data transmitted together with the in-capsule write command prior to storing the host data transmitted together with the in-capsule write command to non-volatile data storage of the data storage system.

15. The data storage system of claim 14, wherein the program code, when executed by the processing circuitry, further causes the processing circuitry to, for each in-capsule write command and prior to allocating any memory pages needed to store the host data transmitted together with the in-capsule write command:

compare a size of the host data transmitted together with the in-capsule write command to a pre-determined upper limit; and in response to the size of the host data transmitted together with the in-capsule write command exceeding the pre-determined upper limit, terminate processing of the in-capsule write command without allocating any memory pages needed to store the host data transmitted together with the in-capsule write command.

16. The data storage system of claim 10, wherein causing the processing circuitry to identify deferred memory page allocation commands and non-deferred memory page allocation commands includes causing the processing circuitry to identify each write command received without host data to be written as a deferred page allocation command.

17. The data storage system of claim 10, wherein causing the processing circuitry to identify deferred memory page allocation commands and non-deferred memory page allocation commands includes causing the processing circuitry to identify each write zero command received as a deferred page allocation command.

18. The data storage system of claim 10, wherein causing the processing circuitry to identify deferred memory page allocation commands and non-deferred memory page allocation commands includes causing the processing circuitry to identify each data set management command as a non-deferred memory page allocation command.

19. A computer program product including a non-transitory computer readable medium having instructions stored thereon, wherein the instructions, when executed on processing circuitry, cause the processing circuitry to perform steps including:

identifying, within host I/O commands received by a data storage system, deferred memory page allocation commands and non-deferred memory page allocation commands; and for each one of those received host I/O commands identified as a deferred memory page allocation command, performing QoS (Quality of Service) policy enforcement before any memory pages are allocated to store host data indicated by the command, at least in part by:

in response to determining that a QoS policy would be violated by processing the command immediately, enqueuing a command descriptor for the command onto a QoS wait queue, wherein the command descriptor includes an indication that memory pages needed to store the host data indicated by the command are to be allocated when the command descriptor is subsequently dequeued from the QoS wait queue.

* * * * *